US008692407B2

(12) United States Patent
Lee et al.

(10) Patent No.: US 8,692,407 B2
(45) Date of Patent: Apr. 8, 2014

(54) POWER LINE TRANSMISSION APPARATUS WITHOUT PUBLIC POWER SYSTEM NOISE INTERFERENCE AND METHOD THEREOF

(75) Inventors: Yu-Lung Lee, Miaoli County (TW); Ming-Chou Kuo, Taipei (TW)

(73) Assignee: Powertech Industrial Co., Ltd., Taipei Hsien (TW)

( * ) Notice: Subject to any disclaimer, the term of this patent is extended or adjusted under 35 U.S.C. 154(b) by 486 days.

(21) Appl. No.: 12/645,884

(22) Filed: Dec. 23, 2009

(65) Prior Publication Data

US 2011/0051818 A1 Mar. 3, 2011

(30) Foreign Application Priority Data

Aug. 31, 2009 (TW) ................................ 98129214 A

(51) Int. Cl.
*H04B 3/54* (2006.01)
(52) U.S. Cl.
USPC .................................................. 307/1; 307/3
(58) Field of Classification Search
USPC ........................... 361/100, 108, 120; 307/1, 3
See application file for complete search history.

(56) References Cited

U.S. PATENT DOCUMENTS

| | | | | |
|---|---|---|---|---|
| 4,611,333 A | * | 9/1986 | McCallister et al. | 375/141 |
| 4,686,356 A | * | 8/1987 | Ueda et al. | 219/482 |
| 4,903,006 A | * | 2/1990 | Boomgaard | 307/3 |
| 5,818,821 A | * | 10/1998 | Schurig | 370/293 |
| 6,307,442 B1 | * | 10/2001 | Meyer et al. | 333/17.1 |
| 6,901,336 B2 | * | 5/2005 | Tesdahl et al. | 702/57 |
| 7,069,091 B2 | * | 6/2006 | Williamson | 700/90 |
| 7,276,915 B1 | * | 10/2007 | Euler et al. | 324/611 |
| 7,456,588 B2 | * | 11/2008 | Alexandrov | 315/294 |
| 7,528,716 B2 | * | 5/2009 | Jackson | 340/539.23 |
| 7,978,726 B2 | * | 7/2011 | Binder | 370/463 |
| 2002/0171992 A1 | * | 11/2002 | Palinkas et al. | 361/119 |
| 2003/0141295 A1 | * | 7/2003 | Ishikawa et al. | 219/697 |
| 2005/0212688 A1 | * | 9/2005 | Chung | 340/870.02 |
| 2006/0192434 A1 | * | 8/2006 | Vrla et al. | 307/64 |
| 2006/0291497 A1 | * | 12/2006 | Binder | 370/436 |
| 2007/0052531 A1 | * | 3/2007 | Mathews et al. | 340/533 |
| 2007/0195823 A1 | * | 8/2007 | Biegert | 370/485 |
| 2009/0212926 A1 | * | 8/2009 | Du et al. | 340/310.11 |

FOREIGN PATENT DOCUMENTS

| | | |
|---|---|---|
| TW | 200735500 A | 9/2007 |
| TW | 200803361 A | 1/2008 |

* cited by examiner

*Primary Examiner* — Hal Kaplan
(74) *Attorney, Agent, or Firm* — Morton J. Rosenberg

(57) ABSTRACT

A power line transmission apparatus is not interfered by the noise of the public power for transmitting high quality video/audio signal. The power line transmission apparatus includes an isolating unit connected between an external power line and an internal power line for isolating a high frequency noise signal carried on the external power line and transmitting a first power signal of the external power line from the external power line to the internal power line, and a power line network interface. The power line network interface includes at least one digital signal input/output interface for inputting or outputting a digital signal, converting the digital signal, and modulating the converted signal into the first power signal to form a second power signal and transmit the second power signal to the internal power line. A home network system without noise signal interference is built by utilizing several power line transmission apparatuses.

12 Claims, 3 Drawing Sheets

POWER LINE TRANSMISSION APPARATUS WITHOUT PUBLIC POWER SYSTEM NOISE INTERFERENCE AND METHOD THEREOF

BACKGROUND OF THE INVENTION

1. Field of the Invention

The present invention relates to a method for transmitting video-audio signals by power lines. In particular, the present invention relates to a power line transmission method that is not interfered by noise of the public power system and an apparatus thereof.

2. Description of Related Art

As display technology and audio play technology has been developed well, people enjoy high quality image and audio. Therefore, the standards of display signal interfaces for high quality image and audio and compression standards of audio signals are established. The video and audio signal interface standards make people enjoy vivid display images and high quality of multi-channel audio. However, display screens and audio players of home theaters or any related devices usually have complicated power lines and signal transmission cables locating out of the devices, such that the living environment becomes a mass.

As shown in FIG. 1, home network 10 includes at least one set of external power line 12 having a plurality of sockets 14. The home network 10 includes a modem 20 connected with an internet 22, a DVD player 30, a VCD player 40, a DVD video camera 50, a computer 60, an audio player 70 and a display screen 80, etc. In the future, air conditioners, refrigerators, telephones, or other home equipments may be connected with the external power line 12 to build up an integrated home network 10. By using remote controllers, the apparatuses connected with the home network 10 are controllable.

By utilizing power line network technology, the quality of signals becomes worse due to the interference by noise of the public power system. Therefore, the signals modulated on the public power signal are interfered by the noise. High video and audio quality which are paid more attention by people nowadays require precise signal transmission quality. Consequently, if the signal transmission quality is affected, it results in troubles for people while applying it.

SUMMARY OF THE INVENTION

The power line transmission apparatus includes a power line network interface and an isolating unit which connected between an external power line and an internal power line in serial for isolating a high frequency noise signal carried on the external power line and transmitting a first power signal of the external power line from the external power line to the internal power line. Therein, the power line network interface includes at least one digital signal input/output interface for inputting or outputting a digital signal, and converting the digital signal so as to load the converted digital signal to the first power signal to generate a second power signal and transmit the second power signal to the internal power line.

The present invention also provides a home network system. The home network system includes an external power line, a first power line transmission apparatus electrically connected with the external power line, and a second power line transmission apparatus electrically connected with the first power line transmission apparatus via an internal power line. The first power line transmission apparatus isolates a high frequency noise signal carried on the external power line out, transmits a first power signal of the external power line from the external power line to the internal power line, receives and converts a digital signal to be modulated into the first power signal to generate a second power signal and transmit the second power signal to the internal power line. The second power line transmission apparatus receives the second power signal, recovers and outputs the digital signal, and isolates the modulated digital signal and the high frequency noise signal out of the second power signal to recover and output the first power signal.

The present invention also provides a power line transmission method, and includes the following steps. An external power line and an internal power line are provided. A first power line transmission apparatus is provided to be electrically connected with the external power line. A digital signal and a first power signal transmitted through the external power line are received. A noise signal of the external power line is isolated and the digital signal is converted and modulated to the first power signal to generate a second power signal. The second power signal is transmitted onto the internal power line. A second power line transmission apparatus is provided to be electrically connected with the internal power line. The second power signal is received and the digital signal modulated on the second power signal is recovered so as to output the recovered digital signal. Meanwhile, a noise signal transmitted on the internal power line is isolated to recover and then output the first power signal.

For further understanding of the present invention, reference is made to the following detailed description illustrating the embodiments and examples of the present invention. The description is for illustrative purpose only and is not intended to limit the scope of the claim.

DETAILED DESCRIPTION OF THE PREFERRED EMBODIMENTS

Figure 1:
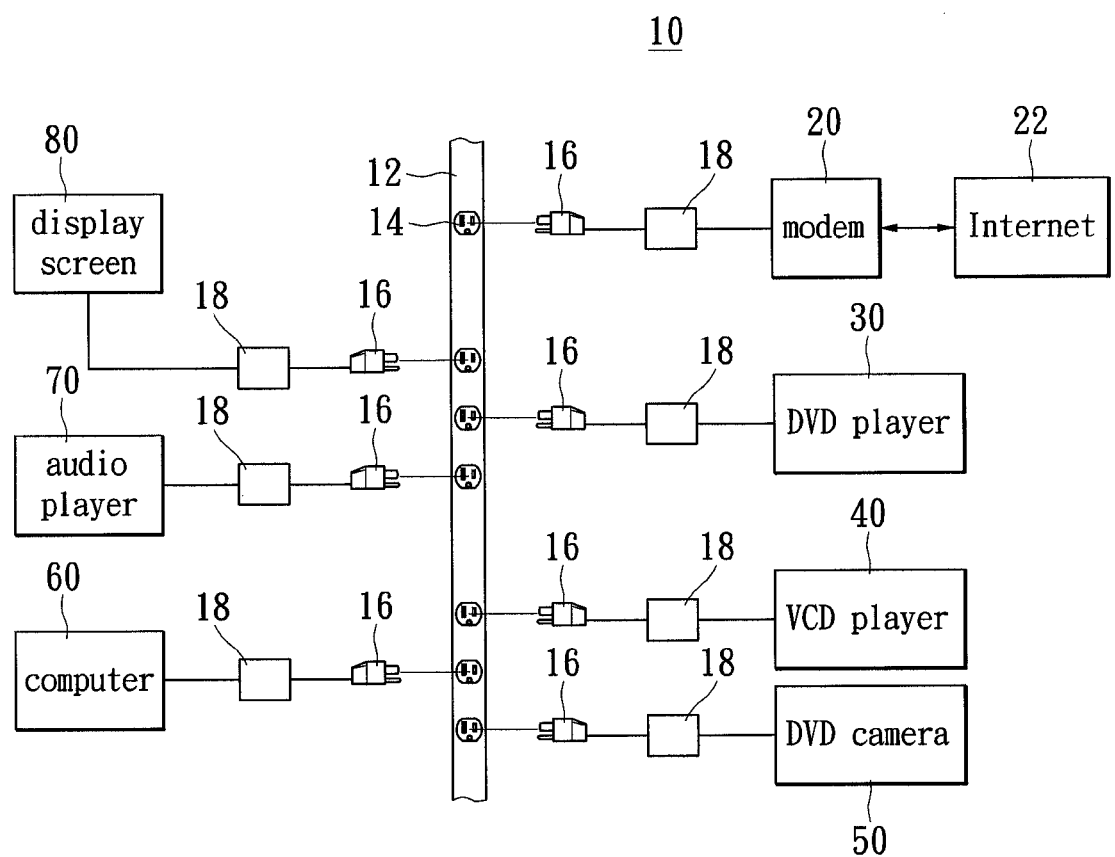
FIG. 1 is a schematic diagram of the home network in accordance with the power line network of the prior art.
Figure 2:
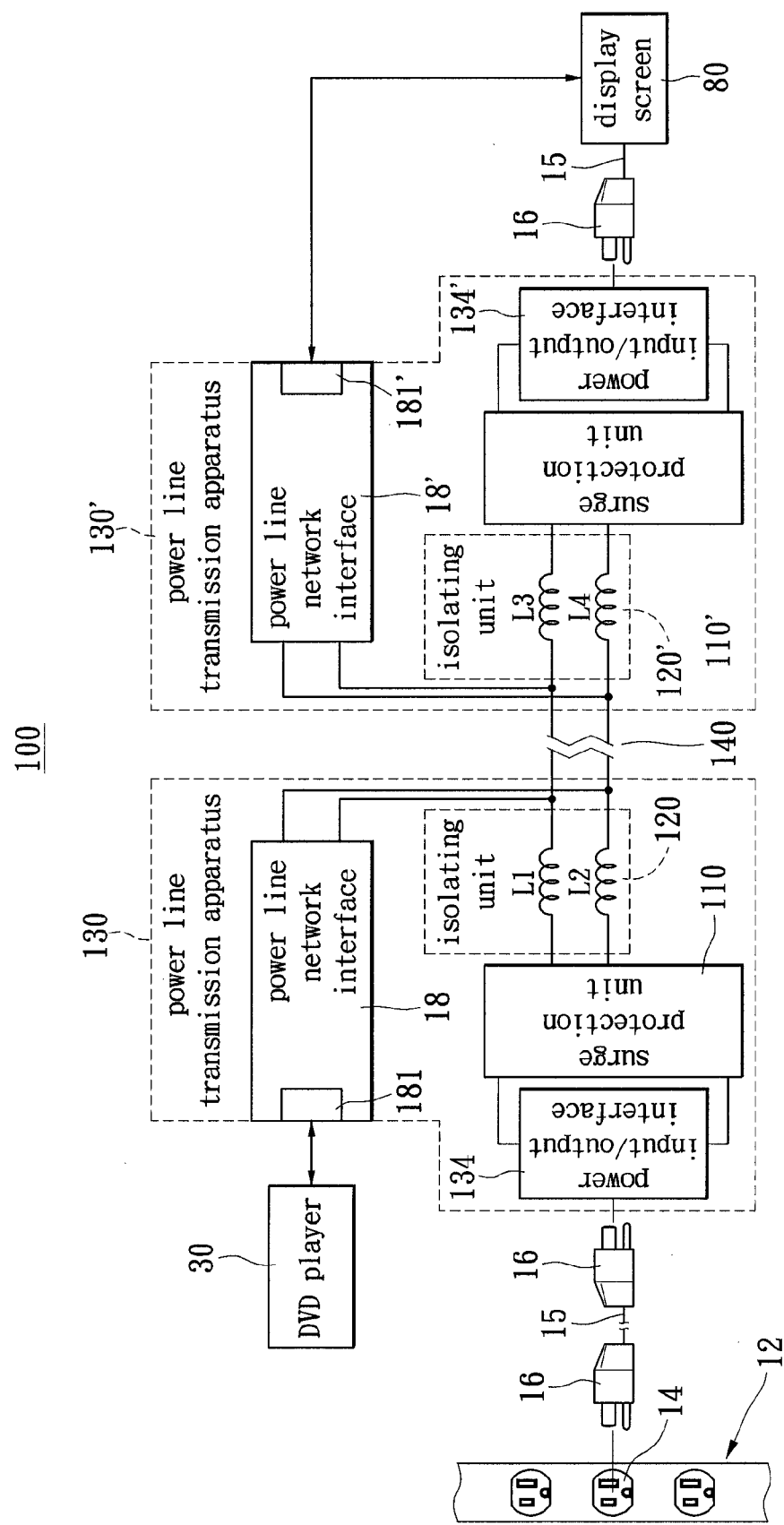
FIG. 2 is a schematic diagram of the power line transmission apparatus of the present invention.

Reference is made to FIG. 2. The power line transmission apparatus 130 includes a power line network interface 18, a surge protection unit 110, an isolating unit 120, and a power input/output interface 134. In this embodiment, the power input/output interface 134 is a socket 14 shown in FIG. 1. Therefore, the surge protection unit 110 of the power line transmission apparatus 130 is electrically connected with the socket 14 on the external power line 12, a power line 15 and two plugs 16 via the power input/output interface 134 so as to receive a first power signal of the external power line 12. One end of the surge protection unit 110 is electrically connected with the power input/output interface 134, and the other end of the surge protection unit 110 is electrically connected with the isolating unit 120. One end of the isolating unit 120 is electrically connected with the surge protection unit 110, and the other end of the isolating unit 120 is electrically connected with an internal power line 140 to isolate the public power system noise interference transmitted from the external power line 12. The power line network interface 18 converts the digital signal and modulates the digital signal into the internal power line 140.

Herein, the surge protection unit 110 is electrically connected with the external power line, a power line 15 and two plugs 16 12 via the power input/output interface 134 to receive the power signals of the external power line 12. The surge protection unit 110 has the surge protection function to reduce or prevent the surge signals from affecting the transmission quality.

The isolating unit 120 is electrically connected with the surge protection unit 110, and its function is to isolate the noise signal transmitted from the external power line 12 out, and transmit the first power signal transmitted from the external power line 12 to the internal power line 140. In other words, the first power signal without noise is passes by the isolating unit 120 and transmitted to the internal power line 140, so that the noise signal generated from the external power line 12 is isolated by the isolating unit 12. Consequently, the first power signal without noise is transmitted to the internal power line 140.

The frequency of the first power signal associated with the public power is about 60 Hz. The frequency of the digital signal converted by the power line network interface 18 might be 4~30 MHz in frequency. Therefore, the isolating unit 120 can make the first power signal that is around 60 Hz in frequency to pass by, and isolate the high frequency noise signal transmitted by the external power line out. The isolating unit 120 transmits the first power signal that is about 60 Hz in frequency and reduces or prevents the digital signal from being interfered by the noise signal. Therefore, the isolating unit 120 can be connected in series between the external power line 12 and the internal power line 140 by utilizing inductors to isolate the high frequency noise signal transmitted from the external power line 12 out and allow the first power signal to pass by. In this embodiment, the frequency of the high frequency noise signal is over 1 MHz. The first power signal on the internal power line 140 that is configured and connected following the isolating unit 120 does not have other high frequency noise signals.

The power line network interface 18 has at least one digital signal input/output interface 181 for inputting a variety of digital signals and is electrically connected with the internal power line 140. The power line network interface 18 inputs the digital signal of the electronic equipments via the digital signal input/output interface 181, converts the digital signal and loads the digital signal onto the first power signal to generate a second power signal. The second power signal is transmitted to the power line transmission apparatus 130' correspondingly via the internal power line 140. Therefore, the above-mentioned second power signal is a signal that is mixed by the first power signal and the high frequency digital signal. The power line network interface 18 also has the decode function that can receive the power signal from the internal power line 140 and convert or recover to the corresponding digital signal from the power signal.

Additionally, in other embodiments, the surge protection unit 110 is not necessary As long as the function in surge protection can be implemented by other surge protection devices.

In this embodiment, the power line transmission apparatus 130' and the power line transmission apparatus 130 have the configurations respected to the same elements and the same connection relationship. The power line transmission apparatus 130' and the power line transmission apparatus 130 are respectively connected with the internal power line 140 to transmit the second power signal and receive the second power signal on the internal power line 140 via the power line network interface 18'. Therefore, the power line transmission apparatus 130 is connected with an external power line 12 so as to input the first power signal, and is connected with a DVD player 30 via the digital signal input/output interface 181 so as to provide digital signals that contains video signals and audio signals. The power line transmission apparatus 130' is connected with a display screen 80 to provide a first power signal without noise and a digital signal without noise interference.

Figure 3:
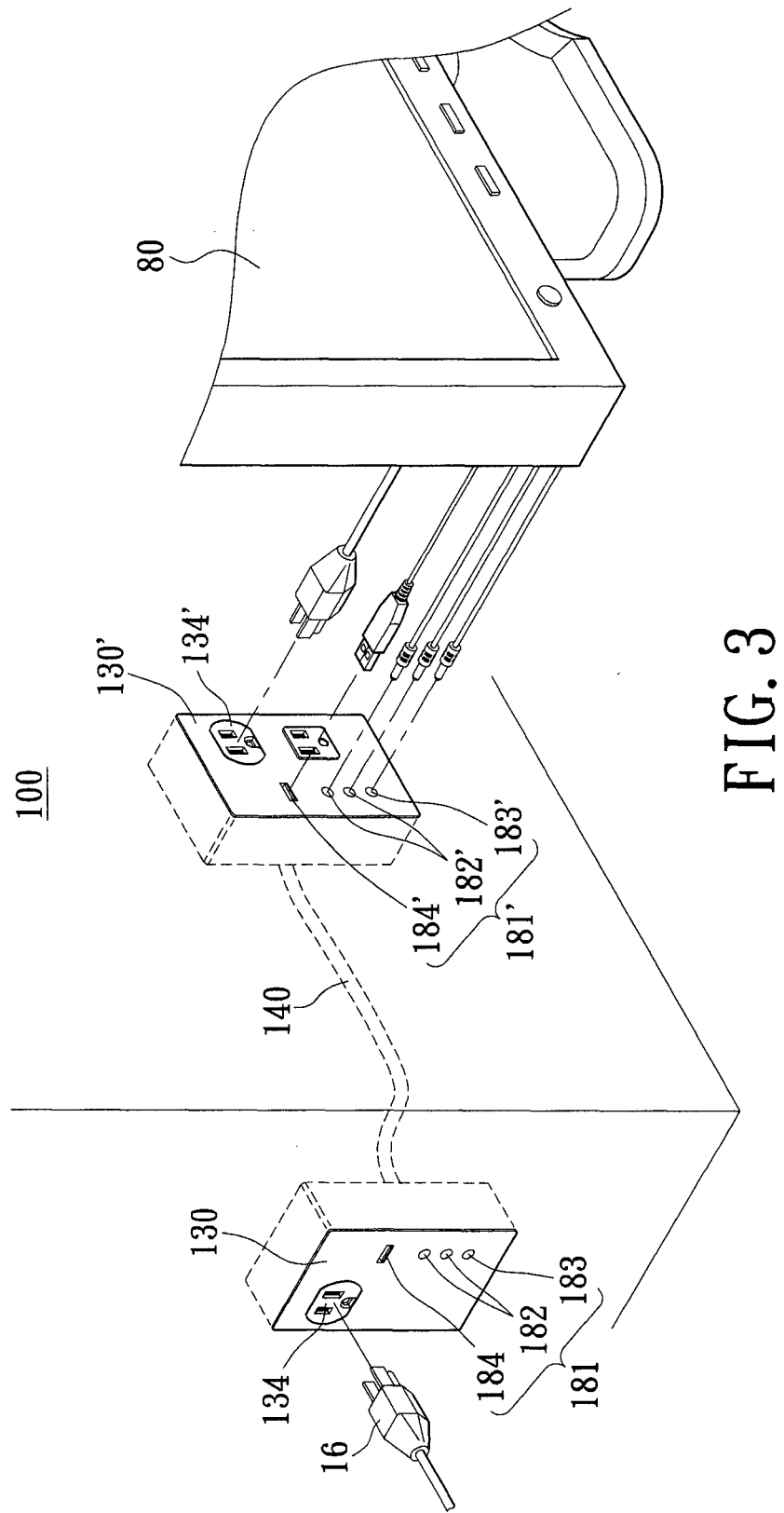
FIG. 3 is a schematic diagram of the home network in accordance with an embodiment of the power line transmission apparatus according to the present invention.

As shown in FIG. 3, the home network 100 includes the power line transmission apparatuses 130, 130' shown in FIG. 2 and an internal power line 140. The power line transmission apparatuses 130, 130' can be a socket device embedded in the wall that integrate and conceal the power lines and signal cables of electronic devices.

The power line transmission apparatuses 130, 130' respectively have a power input/output interface 134. Moreover, the power line transmission apparatuses 130, 130' respectively have a digital signal input/output interface 181, 181', such as a video input/output interface 182, 182', an audio input/output interface 183, 183' or a high resolution multimedia input/output interface 184, 184' etc. The quantity and the sort of the digital signal input/output interface are not limited to above.

In this embodiment, the power input/output interface 134 of the power line transmission apparatus 130 is electrically connected with the external power line 12 via a socket 14 or a plug 16 shown in FIG. 2 and a power line 15. The external power line 12 can transmit the first power signal to the power line transmission apparatus 130. Meanwhile, the first power signal from the external power line 12 may have the interference signals, such as surge signals or noise signals, etc. The power line transmission apparatus 130 uses the surge protection unit 110 shown in FIG. 2 to prevent the surge signal from entering, and uses the isolating unit 120 shown in FIG. 2 to isolate the noise signal out of the power signal. Therefore, by using the surge protection unit 110 and the isolating unit 120, a first power signal without interference signals is transmitted to the internal power line 140.

The power line transmission apparatus 130 uses the digital signal input/output interface 181 to input/output digital signals. The digital signal can be a video, audio, or other information signal from a DVD player or a computer. The digital signal is converted and modulated onto the first power signal to generate a second power signal.

Another end of the internal power line 140 is connected with the power line transmission apparatus 130'. The power line transmission apparatus 130' receives the second power signal of the internal power line 140, and uses the power line network interface 18' shown in FIG. 2 to isolate and decode the modulated digital signal from the power signal and recover back to the corresponding digital signal. The digital signal is outputted to the corresponding electronic device via the digital signal input/output interface 181'. The power line transmission apparatus 130' has the isolating unit 120' shown in FIG. 2. Therefore, the digital signal modulated on the second power signal transmitted through the internal power line 140 can be isolated by the isolating unit 120'.

One set or more than one set of the power line transmission apparatus 130, 130' are provided. By using the power line transmission apparatus 130, 130', an internal power line 140 that can isolate the noise signal out is provided. By applying the technology of modulating signals on the power line, an internal power line 140 with high signal transmission quality is provided, and a power supply without noise signals and surge signals is provided. Furthermore, because the power line transmission apparatus 130, 130' can be embedded into the wall, the power line transmission apparatus 130, 130' installed at home can provide a high quality signal transmission network and high quality power supply.

The description above only illustrates specific embodiments and examples of the present invention. The present invention should therefore cover various modifications and variations made to the herein-described structure and operations of the present invention, provided they fall within the scope of the present invention as defined in the following appended claims.

What is claimed is:

1. A home network system, comprising:
a set of power line transmission apparatuses, one of the set of power line transmission apparatuses being defined as a first power line transmission apparatus, the other one of the set of power line transmission apparatuses being defined as a second power line transmission apparatus, the first power line transmission apparatus connected with the second power line transmission apparatus via an internal power line, and each of the power line transmission apparatuses having a power line network interface and an isolating unit for filtering a high frequency noise signal, the first power line transmission apparatus and the second power line transmission apparatus are identical and interchangeable;
wherein an external power line is selectively connected to one of the first power line transmission apparatus and the second power line transmission apparatus, the power line transmission apparatus connected to the external power line receives and converts a digital signal transmitted through the external power line, and consequently, modulates the converted digital signal into a first power signal so as to generate a second power signal and transmit the second power signal to the power line transmission apparatus not connected to the external power line via the internal power line;
wherein the power line transmission apparatus not connected to the external power line recovers the digital signal on basis of the converted digital signal so as to output the digital signal, and isolates the modulated digital signal and the high frequency noise signal out of the second power signal to recover and output the first power signal, wherein the power line network interface includes at least one digital signal input/output interface for inputting or outputting the digital signal, converting the digital signal into the converted digital signal and modulating the digital signal into the first power signal so as to generate the second power signal, or recover the digital signal from the second power signal.

2. The home network system as claimed in claim 1, wherein the first power line transmission apparatus and the second power line transmission apparatus further comprise a surge protection unit for filtering out a surge signal respectively.

3. The home network system as claimed in claim 1, wherein the digital signal input/output interface is provided for inputting or outputting a video signal or an audio signal.

4. The home network system as claimed in claim 1, wherein the isolating unit is configured by at least one inductor or at least one filtering circuit.

5. The home network system as claimed in claim 1, wherein the isolating unit is designed to allow the first power signal about 60 Hz in frequency to pass.

6. The home network system as claimed in claim 1, wherein the isolating unit isolates the high frequency noise signal with a frequency higher than or equal to 1 MHz.

7. A power line transmission method, comprising:
providing an external power line and an internal power line;
providing a set of power line transmission apparatuses, one of the set of power line transmission apparatuses being defined as a first power line transmission apparatus, the other one of the set of power line transmission apparatuses being defined as a second power line transmission apparatus, the first power line transmission apparatus connected with the second power line transmission apparatus via an internal power line, and each of the power line transmission apparatuses having a power line network interface and an isolating unit for filtering a high frequency noise signal, the first power line transmission apparatus and the second power line transmission apparatus are identical and interchangeable;
wherein an external power line is selectively connected to one of the first power line transmission apparatus and the second power line transmission apparatus, the power line transmission apparatus connected to the external power line receives and converts a digital signal transmitted through the external power line, and consequently, modulates the converted digital signal into a first power signal so as to generate a second power signal and transmit the second power signal to the power line transmission apparatus not connected to the external power line via the internal power line;
wherein the power line transmission apparatus not connected to the external power line recovers the digital signal on basis of the converted digital signal so as to output the digital signal, and isolates the modulated digital signal and the high frequency noise signal out of the second power signal to recover and output the first power signal, wherein the power line network interface includes at least one digital signal input/output interface for inputting or outputting the digital signal, converting the digital signal into the converted digital signal and modulating the digital signal into the first power signal so as to generate the second power signal, or recover the digital signal from the second power signal.

8. The power line transmission method as claimed in claim 7, wherein the first power line transmission apparatus and the second power line transmission apparatus further comprise surge protection units for filtering surge signals, respectively.

9. The power line transmission method as claimed in claim 7, wherein the digital signal input/output interface is provided for inputting or outputting a video signal or an audio signal.

10. The power line transmission method as claimed in claim 7, wherein the isolating unit is configured by at least one inductor or at least one filtering circuit.

11. The power line transmission method as claimed in claim 7, wherein the isolating unit is designed to allow the first power signal about 60 Hz in frequency to pass.

12. The power line transmission method as claimed in claim 7, wherein the isolating unit isolates the high frequency noise signal with frequency over than or equal to 1 MHz.

* * * * *